United States Patent [19]
Kilgore et al.

[11] 3,735,217
[45] May 22, 1973

[54] TWIN MOTOR DRIVE SYSTEM

[75] Inventors: Lee A. Kilgore, Export; Bernard S. Strait, Jr.; Eugene C. Whitney, both of Pittsburgh, all of Pa.

[73] Assignee: Westinghouse Electric Corporation, Pittsburgh, Pa.

[22] Filed: Nov. 1, 1971

[21] Appl. No.: 194,746

[52] U.S. Cl..................................318/100, 318/183
[51] Int. Cl..............................................H02p 5/50
[58] Field of Search......................318/8, 47, 48, 84, 318/183, 100, 98, 99

[56] References Cited

UNITED STATES PATENTS

| | | | |
|---|---|---|---|
| 3,351,830 | 11/1967 | Samson et al. | 318/48 |
| 2,411,147 | 11/1946 | Cooley | 318/8 |
| 2,429,427 | 10/1947 | Rieber | 318/8 X |
| 2,459,253 | 1/1949 | Tyrner | 318/8 |
| 3,434,025 | 3/1969 | Parkinson et al. | 318/8 |
| 3,549,965 | 12/1970 | Hausmann | 318/47 |

Primary Examiner—Benjamin Dobeck
Attorney—A. T. Stratton and F. P. Lyle et al.

[57] ABSTRACT

A twin motor drive system having two synchronous motors of usual construction driving a common load. Means are provided for controlling the field excitation of the motors in a manner to maintain equal division of the load.

5 Claims, 2 Drawing Figures

Patented May 22, 1973

3,735,217

TWIN MOTOR DRIVE SYSTEM

BACKGROUND OF THE INVENTION

The present invention relates to twin synchronous motor drives, and more particularly to means for continuously maintaining equal load division between the motors.

Large grinding mills such as ball or rod mills, and particularly rock or ore grinding mills used in the mining industry, are usually large, low speed machines. Typically, such mills may require drives of several thousand horsepower and operate at speeds in the range from 9 to 22 rpm. The usual practice in driving such mills has been to divide the load between two substantially identical motors driving the mill through suitable reduction gearing which mechanically connects both motors to the mill and reduces the speed to the mill drive speed. In actual practice, small errors of concentricity and tooth angle may occur in the gears and some small degree of misalignment is unavoidable. These unavoidable slight errors cause small angular changes of the load torque angle of each motor with respect to the revolving armature field, and these changes result in a marked pulsation of the load on each motor which can be as high as 10 percent to 30 percent of full load. Since the motors normally drive through pinions on opposite sides of a large drive gear or bull gear, these load pulsations are approximately 180° out of phase in the two motors, and in effect a substantial load unbalance oscillates back and forth between the two motors at a frequency equivalent to the speed of the mill. These pulsating load swings between the two motors are extremely undesirable as they cause rapid wear of the gears, which tends to aggravate the problem, and can cause motor overheating, vibration and possible damage to the gears. Frequent shut-downs and excessive amounts of maintenance result.

Because of this problem, induction motors have usually been used for these large twin motor drives because of their inherent damping which tends to reduce the load swings between the motors. Synchronous motors, however, would be more economical in most cases and would permit control of the power factor, while induction motors of the size required frequently make it necessary to install capacitors or synchronous condensers to obtain an acceptable power factor or voltage regulation, and to maintain stability in many cases. Synchronous motors have not been used to any great extent for this type of drive, however, because of the excessive unbalanced load swings between the motors with the attendant problems. It has been proposed in Herzog U.S. Pat. No. 3,553,552 to utilize synchronous motors in a twin motor mill drive, and to attempt to compensate for the load swings by adjusting the angle of the magnetic axis of the motor field excitation with respect to the rotor poles, so as to shift the load torque angle. This requires a very complicated and expensive construction for the rotor of at least one of the motors, with two or more pole face windings, and an elaborate and expensive control system is also required. This proposed system therefore involves excessive cost as well as substantial maintenance problems due to the elaborate control needed.

SUMMARY OF THE INVENTION

In accordance with the present invention, there is provided a twin motor drive utilizing two synchronous motors of standard or usual construction, with relatively simple control means for maintaining the desired division of load between the motors and substantially eliminating the undesirable pulsating load swings between the motors discussed above. This result is accomplished in a relatively simple and inexpensive manner by sensing the input power of each of the motors and continuously adjusting the field excitations of the motors in a manner to increase the field excitation of the motor with the lower power input and to relatively reduce the field excitation of the motor with the higher power input. By thus controlling the field excitations, the torques developed by the motors are correspondingly controlled and the desired load division is maintained without the pulsations of load in the two motors which have previously made it undesirable to use synchronous motors for this type of drive.

BRIEF DESCRIPTION OF THE DRAWINGS

The invention will be more fully understood from the following detailed description of an illustrative embodiment, taken in connection with the accompanying drawing, in which.

DESCRIPTION OF PREFERRED EMBODIMENT

Figure 1:
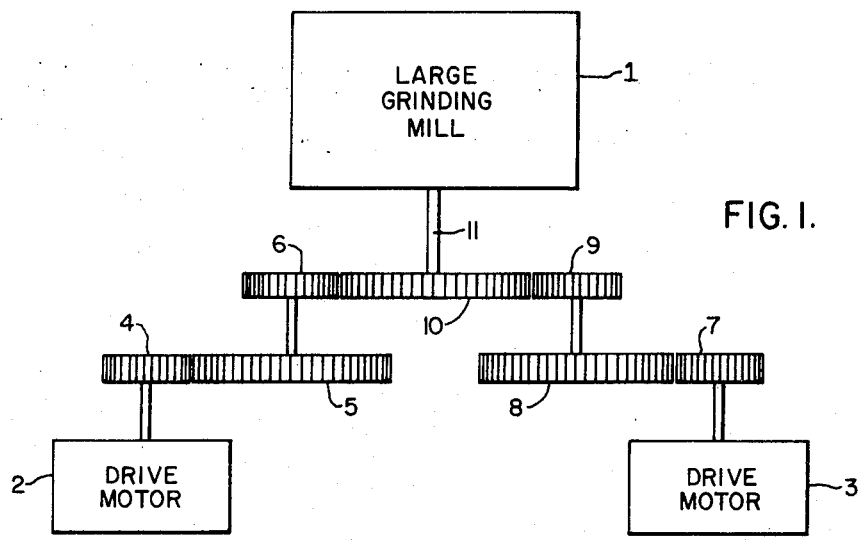
FIG. 1 is a somewhat diagrammatic representation of a typical twin motor drive of the type to which the invention relates.

FIG. 1 shows somewhat diagrammatically, by way of example, a typical twin motor drive of the type with which the invention is concerned. FIG. 1 shows a mill 1 which may be a large grinding mill, such as a ball or rod mill, and which as previously explained operates at a very low speed and requires a drive of several thousand horsepower. The mill 1 is driven by two electric motors 2 and 3, which are preferably substantially identical and which drive the mill 1 through suitable reduction gearing. As shown, the motor 2 drives through double reduction gearing consisting of a first pinion 4 and drive gear 5 driving a pinion 6. The motor 3 similarly drives through a pinion 7 and drive gear 8 driving a pinion 9. The two pinions 6 and 9 drive opposite sides of a main drive gear or bull gear 10 on the shaft 11 of the mill 1. Thus, the two motors are mechanically connected to the common load by the reduction gearing which reduces the speed to the required low mill speed and which drives the mill through the common final drive gear 10.

As previously stated, the motors 2 and 3 are preferably substantially identical so as to divide the load equally. Because of the unavoidable small inaccuracies in the gearing and the slight misalignments which unavoidably occur, pulsations or swings in the load on each motor occur which can reach magnitudes as great as 10 percent to 30 percent of the rated full load. Since the motors drive through pinions engaging the drive gear 10 on opposite sides, these pulsations are approximately 180° apart in the two motors and occur at a frequency equal to the speed of the mill 1, so that in effect an unbalanced load oscillates back and forth between the two motors at a frequency corresponding to the mill speed. This large oscillation of load between the two motors is obviously undesirable and leads to overheating of the motors and excessive wear of the gears.

Figure 2:
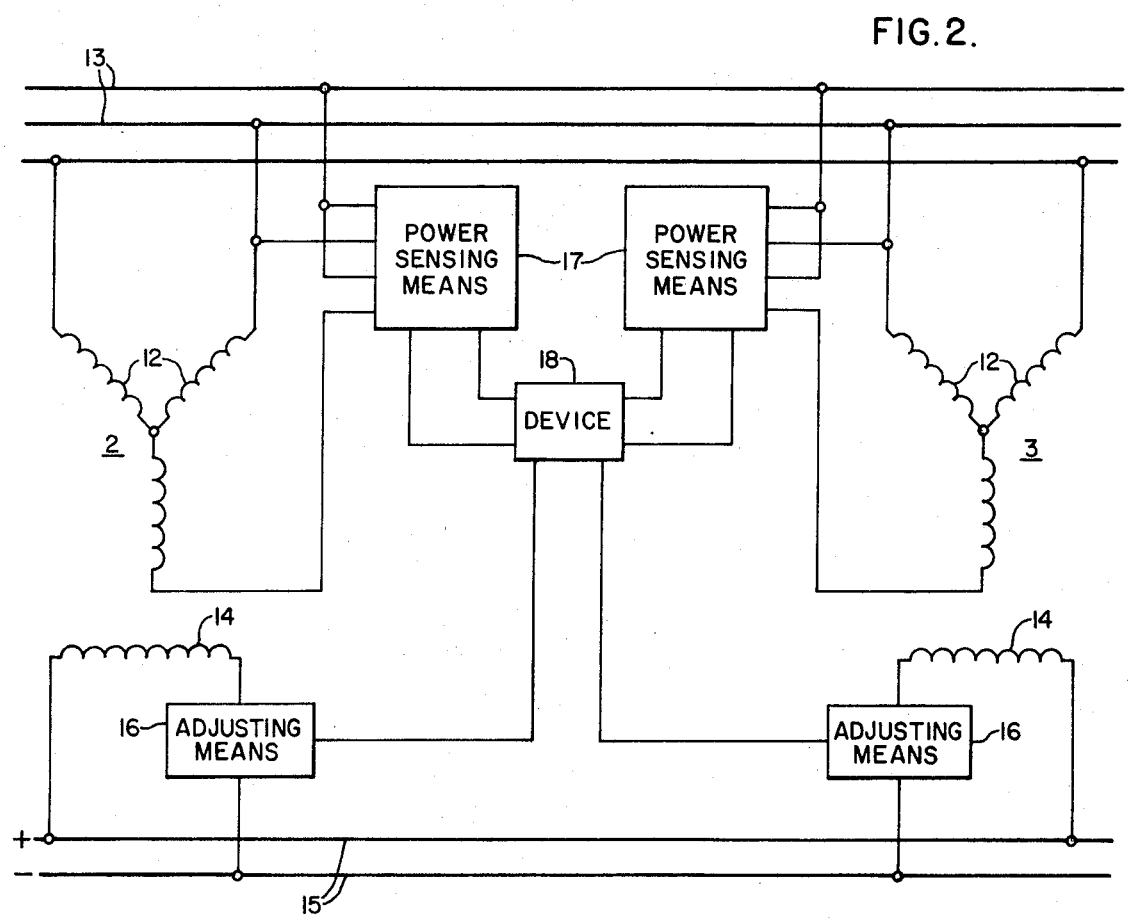
FIG. 2 is a schematic diagram of an illustrative control scheme embodying the invention.

In accordance with the present invention, the undesirable load pulsations are compensated for and substantially eliminated by the means schematically shown in FIG. 2. As there shown, each of the motors 2 and 3 is a synchronous motor of standard or conventional construction. Any desired physical structure may be used for the motors and each motor is provided with a three-phase stator winding 12 of any desired type. The stator windings 12 may be supplied from a three-phase line 13 in the usual manner, any desired type of starting control being utilized although it has not been shown as it is not a part of the invention. Each of the motors 2 and 3 also has a direct current field winding 14 of usual arrangement, and the field windings 14 are excited with direct current from any suitable source indicated at 15. Each of the field windings 14 is also provided with an adjustable control means 16 for independently controlling the field currents of the respective windings. The control means 16 may be any suitable type of automatically and continuously controllable device, such as a motor operated rheostat or a solid-state control device.

The torque developed by a synchronous motor is a function of the field excitation and can thus be controlled by varying the field current. The torque developed by the motor may be indirectly measured by measuring the power input to the motor and the torques developed by two motors can thus the motor, compared by comparing the power inputs. If the motors are nominally identical and are assumed to have identical losses which are relatively constant, the kilowatt inputs to the two motors should be equal if the loads are equal. Thus, the division of load between the two motors can be determined by comparing their power inputs, and the load division can be controlled by controlling the field excitation to continuously adjust the torques developed by the two motors. This may appear contrary to the usual concept that the load angle in a synchronous machine controls the real power while the excitation controls the reactive power. Actually, however, even at high power factors, the load angle can be changed by varying the excitation which in effect changes the relation between real and reactive power. In the case of a twin motor drive, such as is under discussion, this means that if the motors are assumed to be identical, the desired load division can be maintained by increasing the field excitation of the motor developing the lower torque and reducing the field excitation of the motor developing the higher torque. Since the power input can be taken as an indication of the torque, and is more conveniently measured, the power inputs to the two motors can be measured and compared and the field excitations of the two motors continuously adjusted accordingly. The effect of this is that the relation of real and reactive power in the two motors is changed in opposite directions, such that the total real power of the two motors remains constant and the average power factor will also remain constant. By continuously adjusting the field excitations in the manner indicated, however, the loads of the two motors will be kept substantially balanced and the excessive oscillation of load between the two motors is compensated and substantially eliminated.

FIG. 2 shows schematically a suitable control system for this purpose. As there shown, a power sensing means 17 is provided for each motor. The power sensing means 17 may be watt transducers, such as Hall generator devices, or they may be watt-meter elements of any suitable type, or any other device capable of sensing the power inputs to the motors and providing suitable signals. The power input signals thus obtained are compared or balanced in a suitable means 18, which may be a comparator of any suitable type, or any device which will provide an output signal representative of the magnitude and direction of the difference between the power inputs of the two motors. The device 18 may, of course, be combined with the devices 17 if desired, or a differential signal may be obtained by balancing the signals of the devices 17 against each other. The signals from the device 18 are supplied to the two field current adjusting means 16 to continuously adjust the currents in the field windings 14 of the two motors. Thus, in operation the power inputs of the motors 2 and 3 are continuously sensed and compared and the field currents of the two motors are continuously adjusted in a manner to increase the field excitation of the motor with the lower power input and to reduce the field excitation of the motor with the higher power input. In this way the power swings or pulsations between the two motors which have been so objectionable are substantially eliminated and the load is kept continuously balanced between the two motors.

A particular embodiment of the invention has been shown and described for the purpose of illustration, but it will be apparent that the invention is not limited to the particular arrangement shown. Thus, any suitable power sensing means may be used and differential or comparative signals of any type may be derived and used to control any desired type of excitation system to continuously control the field currents in the manner described.

What we claim is:

1. In combination, two synchronous motors, each of said motors having an armature winding adapted to be supplied with alternating current and having a field winding, means for supplying direct current excitation to said field windings, means for individually controlling the excitation of each field winding, means for mechanically connecting said motors to drive a common load, and means responsive to the power inputs to said motors for continuously adjusting said field excitation controlling means to relatively reduce the field excitation of the motor with the higher power input and increase the field excitation of the motor with the lower power input.

2. The combination of claim 1 in which the two motors are substantially identical.

3. In combination, two synchronous motors, means for mechanically connecting said motors to drive a common load, each of said motors having an armature winding and a field winding, means for supplying direct current field excitation to said field windings, means for sensing the power inputs to each of said motors, and means controlled by said sensing means for continuously adjusting the excitation of said field windings to reduce the field excitation of the motor having the higher power input and to increase the field excitation of the motor having the lower power input.

4. The combination of claim 3 in which the two motors are substantially identical.

5. The combination of claim 4 in which said sensing means continuously senses and compares the power inputs to each of the motors, and including means for individually controlling the excitation of said field windings in response to signals from said sensing and comparing means.

* * * * *